United States Patent [19]
Li et al.

[11] Patent Number: 5,978,144
[45] Date of Patent: Nov. 2, 1999

[54] PRISM FOR OPTICAL SYSTEM

[75] Inventors: Li-Man Li; Chi-Shing Chan; Chi-Keung Chung, all of Kowloon, The Hong Kong Special Administrative Region of the People's Republic of China

[73] Assignee: Hong Kong Productivity Council, Kowloon, The Hong Kong Special Administrative Region of the People's Republic of China

[21] Appl. No.: 08/964,424

[22] Filed: Nov. 4, 1997

[51] Int. Cl.[6] ...................................................... G02B 5/04
[52] U.S. Cl. ............................................ 359/640; 359/837
[58] Field of Search ..................................... 359/643–647, 359/833–837, 629–633, 640

[56] References Cited

U.S. PATENT DOCUMENTS 5,689,373  11/1997  Takato ..................................... 359/646

Primary Examiner—Scott J. Sugarman
Attorney, Agent, or Firm—Alix, Yale & Ristas, LLP

[57] ABSTRACT

A prismatic optical device employs an improved prismatic image erecting system with curved refracting surfaces. The optical device can be any one of a wide variety of known devices such as telescopes and binoculars which include an objective, an image erecting system and an ocular. The erecting prism of the optical system is preferably an integral prism formed of optical quality plastic and may comprise a Porro erecting prism system or an image erecting system employing pentangular or roof prisms.

15 Claims, 19 Drawing Sheets

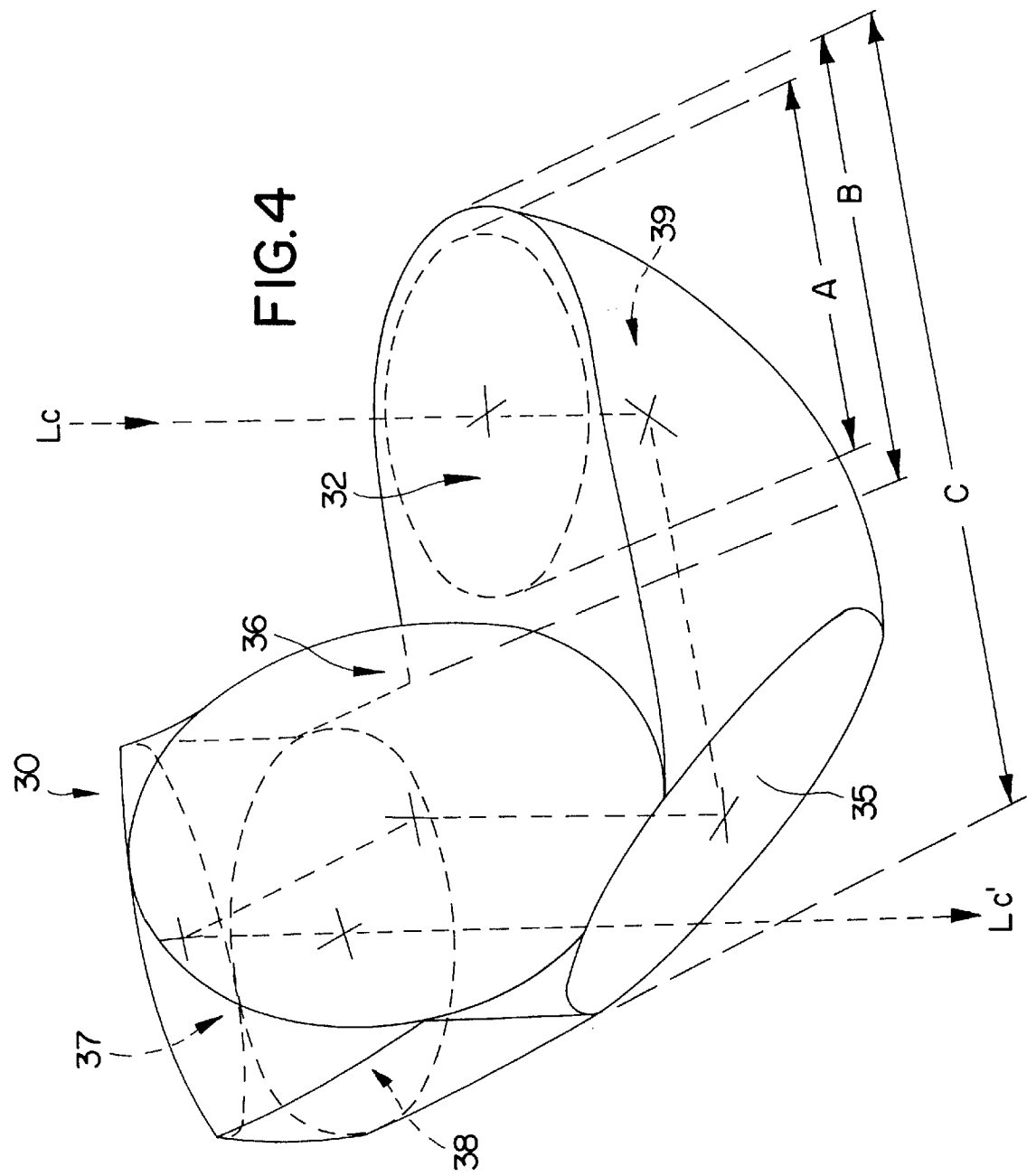

TRANSVERSE RAY FAN PLOT

MAXIMUM SCALE: +/- 200.000 MICRONS
0.486   0.588   0.656

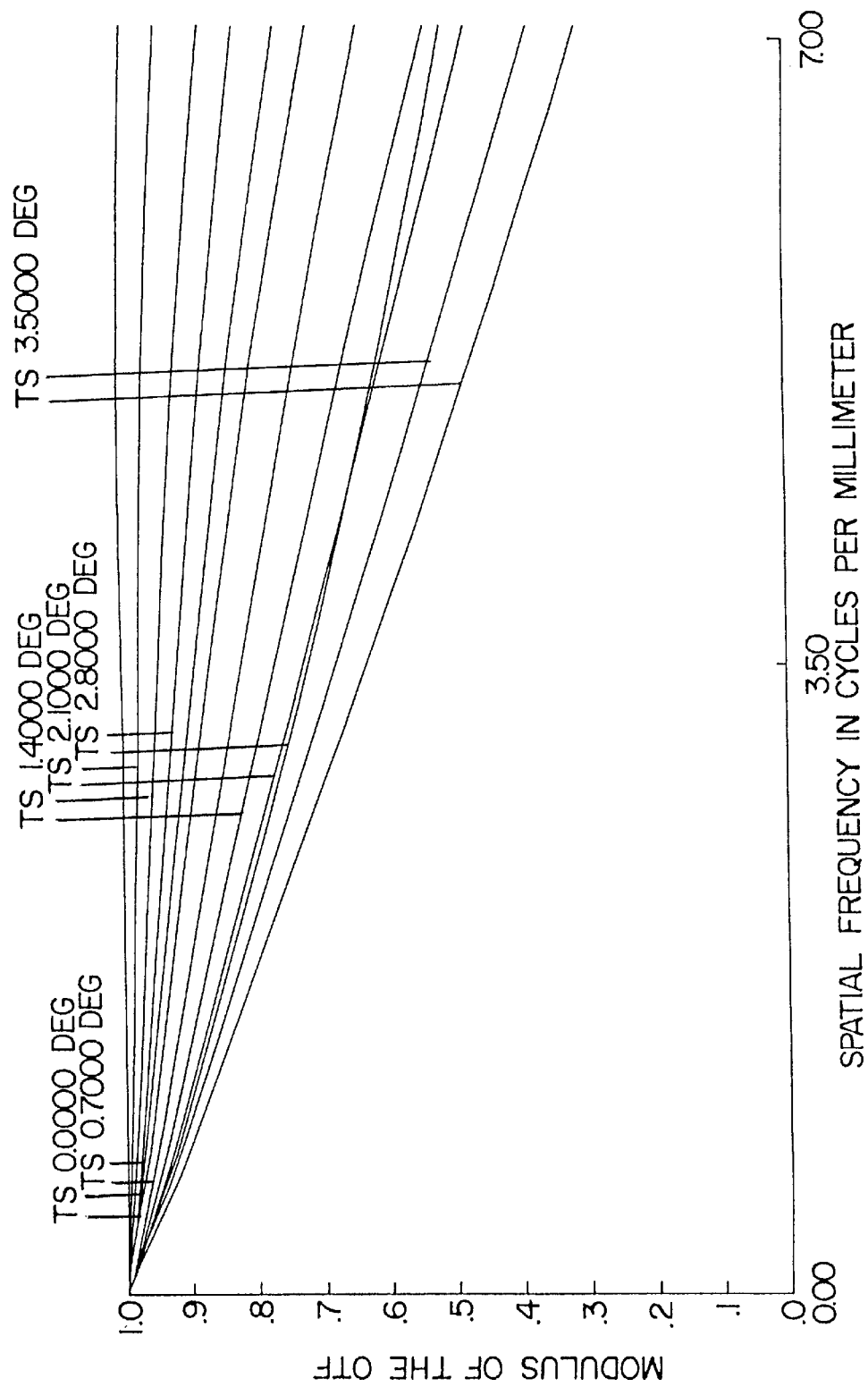

a. RMS RADIUS OF SPOT SIZE AT DIFFERENT ANGLE OF FIELD (μm)

| ANGLE OF FIELD (DEG.) | 0.0 | 0.7 | 1.4 | 2.1 | 2.8 | 3.5 |
|---|---|---|---|---|---|---|
| GLASS PRISM | 35 | 30 | 21 | 17 | 33 | 61 |
| FLAT PLASTIC PRISM | 25 | 28 | 33 | 35 | 40 | 80 |
| CURVED PLASTIC PRISM | 20 | 22 | 25 | 28 | 38 | 62 | b. AVERAGE MTF VALUE AT 7 lp/mm AT DIFFERENT ANGLE OF FIELD, %

| ANGLE OF FIELD (DEG.) | 0.0 | 0.7 | 1.4 | 2.1 | 2.8 | 3.5 |
|---|---|---|---|---|---|---|
| GLASS PRISM | 47 | 58 | 79 | 83 | 50 | 30 |
| FLAT PLASTIC PRISM | 61 | 56 | 56 | 66 | 66 | 33 |
| CURVED PLASTIC PRISM | 72 | 71 | 71 | 72 | 68 | 35 | c. LIGHT TRANSMISSION VALUE AT DIFFERENT ANGLE OF FIELD, %

| ANGLE OF FIELD (DEG.) | 0.0 | 0.7 | 1.4 | 2.1 | 2.8 | 3.5 |
|---|---|---|---|---|---|---|
| GLASS PRISM | 57.8 | 55.4 | 52.8 | 51.9 | 50.7 | 49.7 |
| FLAT PLASTIC PRISM | 58.9 | 58.6 | 56.2 | 55.0 | 54.5 | 51.2 |
| CURVED PLASTIC PRISM | 58.9 | 58.6 | 56.1 | 54.9 | 54.2 | 51.1 |

PRISM FOR OPTICAL SYSTEM

BACKGROUND OF THE INVENTION

1. Field of the Invention

The present invention generally relates to the field of optics and particularly to the field of prismatic optical devices. More specifically, the present invention pertains to optical devices such as telescopes and binoculars employing prismatic image erecting systems. Accordingly, the general objects of the present invention are to provide novel and improved apparatus of such character.

2. Description of the Related Art

Optical devices employing image erecting systems are well known in the art. Such devices typically utilize an objective and an ocular in cooperation with the erecting system to present a magnified image of an object to a viewer. Astronomical telescopes, terrestrial telescopes and prism binoculars are but a few examples of such devices. Image erecting systems are needed in such devices to reverse and invert, i.e., rectify in directions both parallel to and perpendicular to, the image formed by the objective since the objective inherently reverses and inverts images as light passes therethrough. However, the use of image erecting systems necessarily yields the undesirable result that four times the focal length of the erecting lens must be added to the sum of the focal lengths of the objective and ocular in order to present a sharp image to a user's eye. In the case of terrestrial telescopes this results in an unduly long draw tube.

This deficiency has conventionally been overcome in a number of ways, all of which employ the phenomenon of total internal reflection to reflect light rays passing therethrough to reverse and invert the image produced by the objective. According to a first solution, the image erecting system can be comprised of a pair of 45°–45°–90° triangular prisms (hereinafter "Porro prisms") wherein the hypotenuse of each triangular prism faces one another and wherein the prisms are oriented at right angles to one another. This erecting system configuration is known as a "Porro prism erecting system." The deficiencies associated with such Porro prism erecting systems include the fact that each of the Porro prisms used therein have, in the past, been formed of a separate piece of expensive Crown glass with a refractive index larger than 1.5 using an expensive three step process of blocking, grinding and polishing. Further, in an attempt to minimize manufacturing costs, the size and shape of the prisms are often not optimized to the dimensions of the light ray cone expectedly incident thereto. This results in the existence of non-ray path areas of the prisms which serve no useful purpose but do have the undesirable effect of enlarging the overall size of the optical device.

Another deficiency of the Porro prism erecting systems of the related art arise from the need to mechanically mount the prisms within the optical device. Such mounting inevitably results in, at least, a small gap existing between the two prisms. This gap is responsible for light transmission losses (usually of about 8%) and polarization, chromatic and spherical aberrations at the surfaces of both hypotenuses. While polarization aberration and light reflection losses can be reduced by depositing expensive optical coatings between the prisms, this further increases costs. Furthermore, chromatic and spherical aberrations cannot be so rectified. Thus, additional lenses have been required to correct such defects. Finally, even assuming the presence of such a gap can be tolerated, the need to ensure precise alignment between the Porro prisms of the erecting system further increases the cost and difficulty of assembling such optical devices.

A second way to avoid the deficiency of utilizing an unduly long draw tube in an optical device employing an image erecting system is to form the image erecting system from a pair of pentangular roof prisms, also known as Amici prisms or ridge glass prisms. Aside from possessing most of the deficiencies noted above, the use of such image erecting systems entails bearing the additional expense of utilizing expensive jigs and other tools to manufacture the odd-shaped roof prisms and incurring additional assembly costs.

A final way to avoid the deficiency of utilizing an unduly long draw tube in such optical devices is to form the image erecting system from reflecting mirrors which are arranged in a prism-like form. While this solution can be somewhat less expensive than the above-noted solutions (due to the relatively low cost associated with producing the mirrors), any mirror misalignment which may exist will introduce errors the magnitude of which are multiplied up to four times as light passes through the erecting system and into the ocular. Thus, even small positional errors can lead to significant image distortion.

Therefore, there remains a need in the art for an optical system with an improved image erecting system which reduces light transmission losses as well as polarization, chromatic and spherical aberrations thereby minimizing the number of lenses necessary to form a high quality optical device.

There remains an additional need in the art for an optical system with an improved image erecting system which offers improved performance while reducing material, component-manufacturing and assembly costs.

There remains a further need in the art for an optical system with an improved image erecting system which offers an optimal combination of simplicity, economy, precision and versatility.

SUMMARY OF THE INVENTION

It is, accordingly, an object of the present invention to provide a prismatic optical system with an improved erecting prism system that reduces light transmission losses as well as polarization, chromatic and spherical aberrations which, in turn, minimizes the number of lenses required to form a high quality optical device.

It is another object of the present invention to provide a prismatic optical system with an improved erecting prism system which offers improved performance while reducing material, component-manufacturing and assembly costs.

It is still another object of the present invention to provide a prismatic optical system with an improved erecting prism system which offers an optimal combination of simplicity, economy, precision and versatility.

It is yet another object of the present invention to provide an integral image erecting prism for use in a prismatic optical device which offers the advantages noted immediately above.

These and other objects and advantages of the present invention are provided in one embodiment by a prismatic optical system employing an improved image erecting system which utilizes at least one prism with curved refracting surfaces and a plurality of totally internally reflecting reflective surfaces. The optical system can be any one of a wide variety of known devices such telescopes and binoculars which include an objective, an image erecting prism system and an ocular. The erecting prism of the optical system is preferably an integral prism formed of optical quality plastic and may comprise a Porro prism erecting system or an image erecting system employing pentangular roof prisms.

One advantage of the present invention over the related art is that the refracting surfaces of the prism(s) are advantageously contoured to compensate for at least some of the aberrations inherently introduced into the image by the objective. Additionally, the refracting surfaces of the prism (s) can also be contoured to compensate for at least some of the aberrations which would otherwise result from the use of the integral plastic prism(s) themselves. Among other things, contouring the refracting surfaces in this manner avoids the need to utilize additional image-correcting lenses in such optical devices.

Other advantages of the present invention flow from the use of a single integral prism formed from optical quality plastic. For example, light transmission through the integral image erecting prism is improved relative to multi-component prism erecting systems of the related art because an integral prism does not have component interfaces at which light transmission losses can occur. Moreover, component manufacturing and assembly costs are minimized due to the smaller number of components that are needed to form an optical device in accordance with the present invention. Finally, shaping of the prism of the present invention for optimal cooperation with the light ray cone expectedly incident thereto virtually eliminates non-ray path areas and thereby minimizes the overall size of the inventive optical devices.

Numerous other advantages and features of the present invention will become apparent to those of ordinary skill in the art from the following detailed description of the preferred embodiments, from the claims and from the accompanying drawings.

BRIEF DESCRIPTION OF THE DRAWINGS

The preferred embodiment of the present invention will be described below with reference to the accompanying drawings wherein like numerals represent like structures and wherein:

FIG. 4 is a perspective view of an integral image erecting prism in accordance with a first embodiment of the present invention;

FIGS. 10a through 10c are charts illustrating the performance characteristics of the optical system of FIGS. 8 and 9; and FIGS. 11a through 13b are charts comparing various performance characteristics for the optical systems of FIGS. 2, 6 and 9.

DESCRIPTION OF THE PREFERRED EMBODIMENTS

Figure 1:
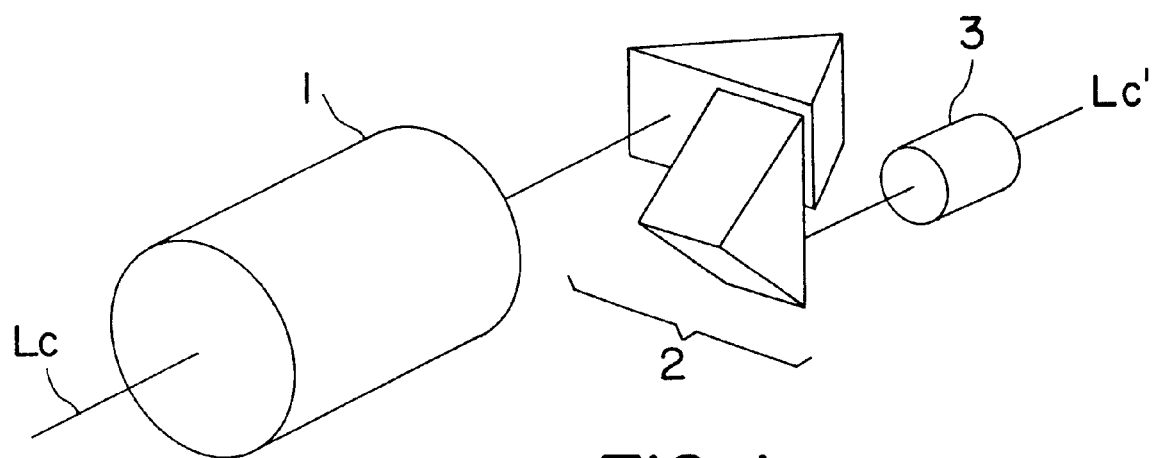
FIG. 1 is a schematic representation of a representative prismatic optical system of the related art.

The present invention can be best appreciated with comparative reference to the representative optical system of the related art as shown in FIGS. 1 through 3c and as described below. As depicted in FIG. 1, light enters optical device 20 through an objective 21 along an optical axis Lc, passes through Porro prism erecting system 22 and exits optical device 20 through ocular 23 along optical axis Lc'. This arrangement permits light to enter and leave the Porro prisms at right angles to the refracting surfaces of each hypotenuse and be totally reflected at each of the four shorter, inclined faces. Those of ordinary skill will readily appreciate that device 20 of FIG. 1 is a functional telescope and that arranging two of such devices in parallel will form a pair of binoculars.

Figure 2:
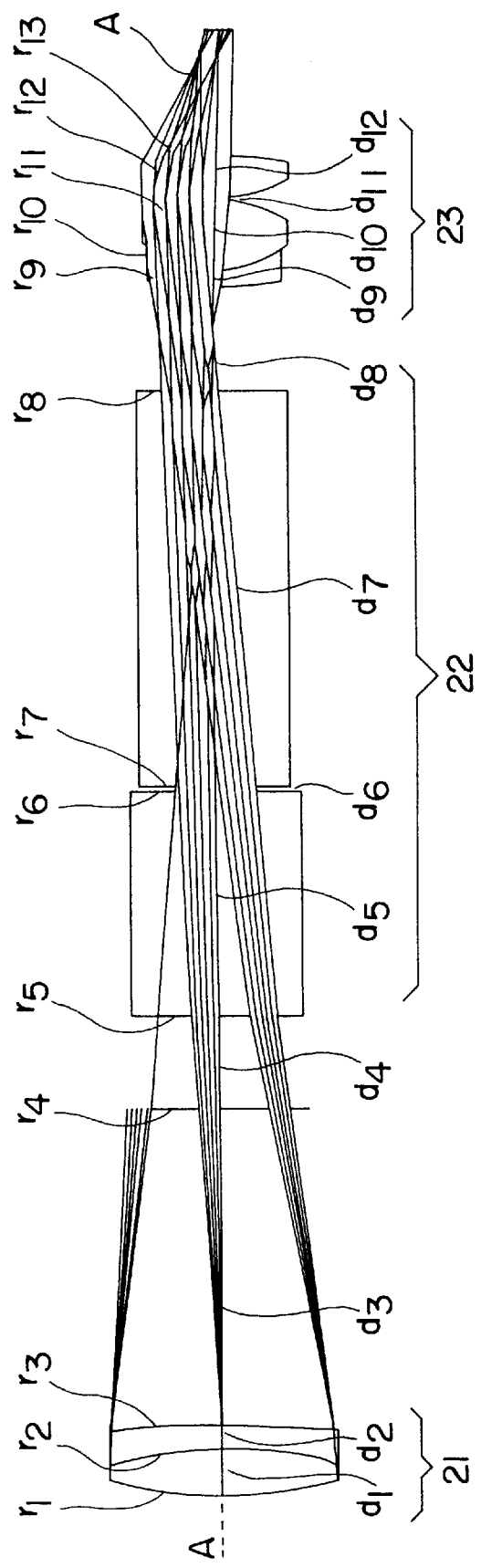
FIG. 2 is a light ray diagram of the optical system of FIG. 1.

FIG. 2 is a light ray diagram of the optical system 20 of FIG. 1, and Table I is a chart containing representative parameter values for the optical system shown in FIGS. 1 and 2.

TABLE I

PRIOR ART

Focal length of objective, fob = 82.7 mm
Focal length of ocular, foc = 10.2 mm
Magnification power, B = 7.9 times
Objective diameter, $\phi$ = 21 mm
Apparent field of view, 2w = 7°
Ocular/Eye point distance, EP = 11.3 mm
Optical device overall length (object point = 00), $\Sigma d$ = 131.6163 mm

| fob = 82.0 mm | foc = 10.6 mm | B = 7.7X | $\phi$ = 21 mm |
|---|---|---|---|
| 2w = 7° | EP = 11.3 mm | $\Sigma d$ = 131.88901 mm | |
| (Objective 21) | | | |
| $r_1$ = 46.2910 | $d_1$ = 4.4 | $n_1$ = 1.5163 | $v_1$ = 64.10 |
| $r_2$ = −35.1230 | $d_2$ = 2.1 | $n_2$ = 1.6199 | $v_2$ = 36.30 |
| $r_3$ = −153.460 | $d_3$ = 28.833 | | |
| $r_4$ = ∞ | $d_4$ = 8.0 | | |
| (Image erecting prism system 22) | | | |
| $r_5$ = ∞ | $d_5$ = 19.99 | $n_5$ = 1.5163 | $v_5$ = 64.10 |
| $r_6$ = ∞ | $d_6$ = 0.5 | | |
| $r_7$ = ∞ | $d_7$ = 35.72 | $n_5$ = 1.5163 | $v_5$ = 64.10 |
| $r_8$ = ∞ | $d_8$ = 9.296 | | |
| (Ocular 23) | | | |
| $r_9$ = 123.59 | $d_9$ = 1.30 | $n_9$ = 1.80608 | $v_9$ = 25.40 |
| $r_{10}$ = 10.3040 | $d_{10}$ = 6.10 | $n_{10}$ = 1.5891 | $v_{10}$ = 61.20 |
| $r_{11}$ = −14.3560 | $d_{11}$ = 0.45 | | |
| $r_{12}$ = 13.6140 | $d_{12}$ = 0.5 | $n_{12}$ = 1.6568 | $v_{12}$ = 51.10 |
| $r_{13}$ = −35.6170 | | | |

Those of ordinary skill will readily appreciate that, as used in Table I, r represents the radius of curvature in millimeters, d represents the thickness as measured along an axis A in millimeters, n represents the refractive index of each component shown therein and v represents the Abbe's number of the material used to form the respective components.

Figure 3A:
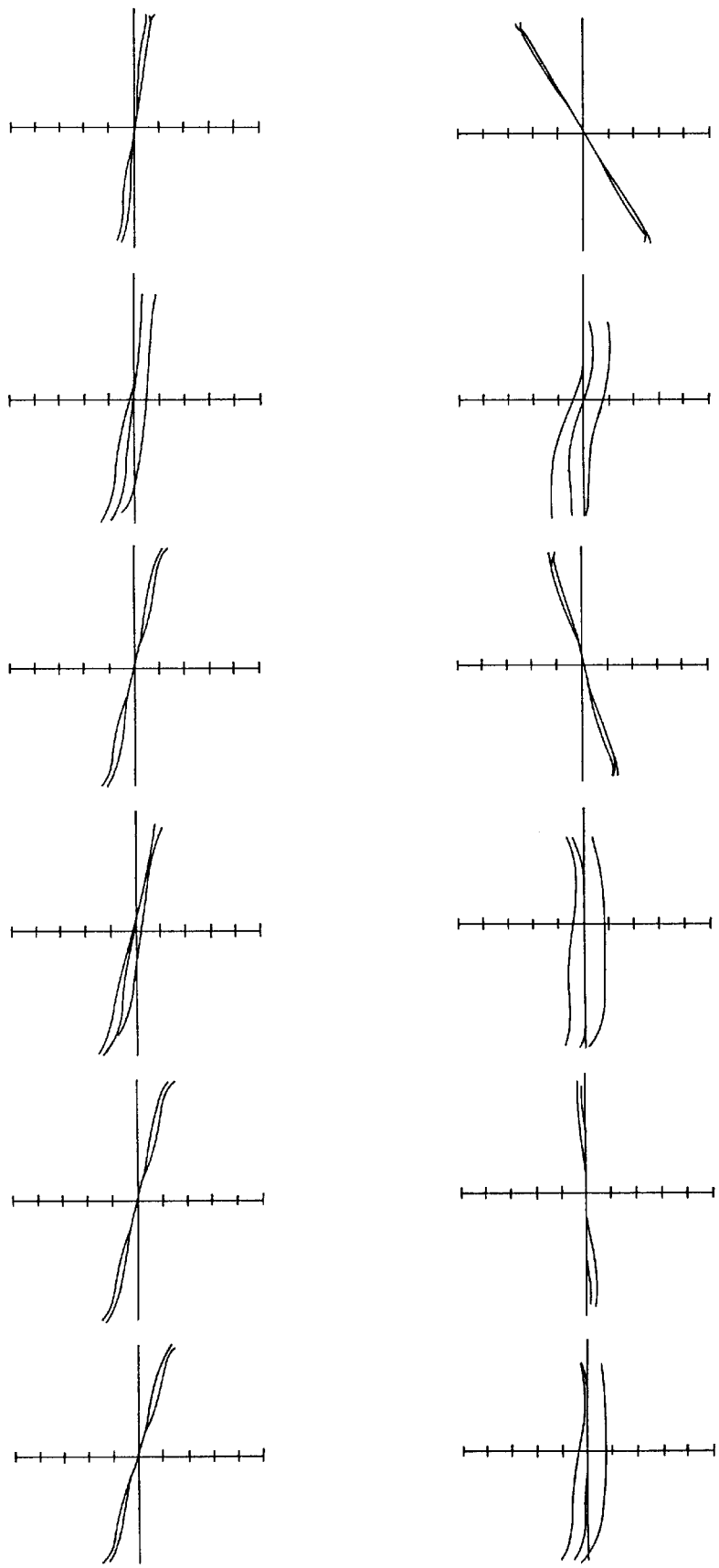
FIGS. 3a through 3c are charts illustrating the performance characteristics of the optical system of FIGS. 1 and 2.
Figure 3B:
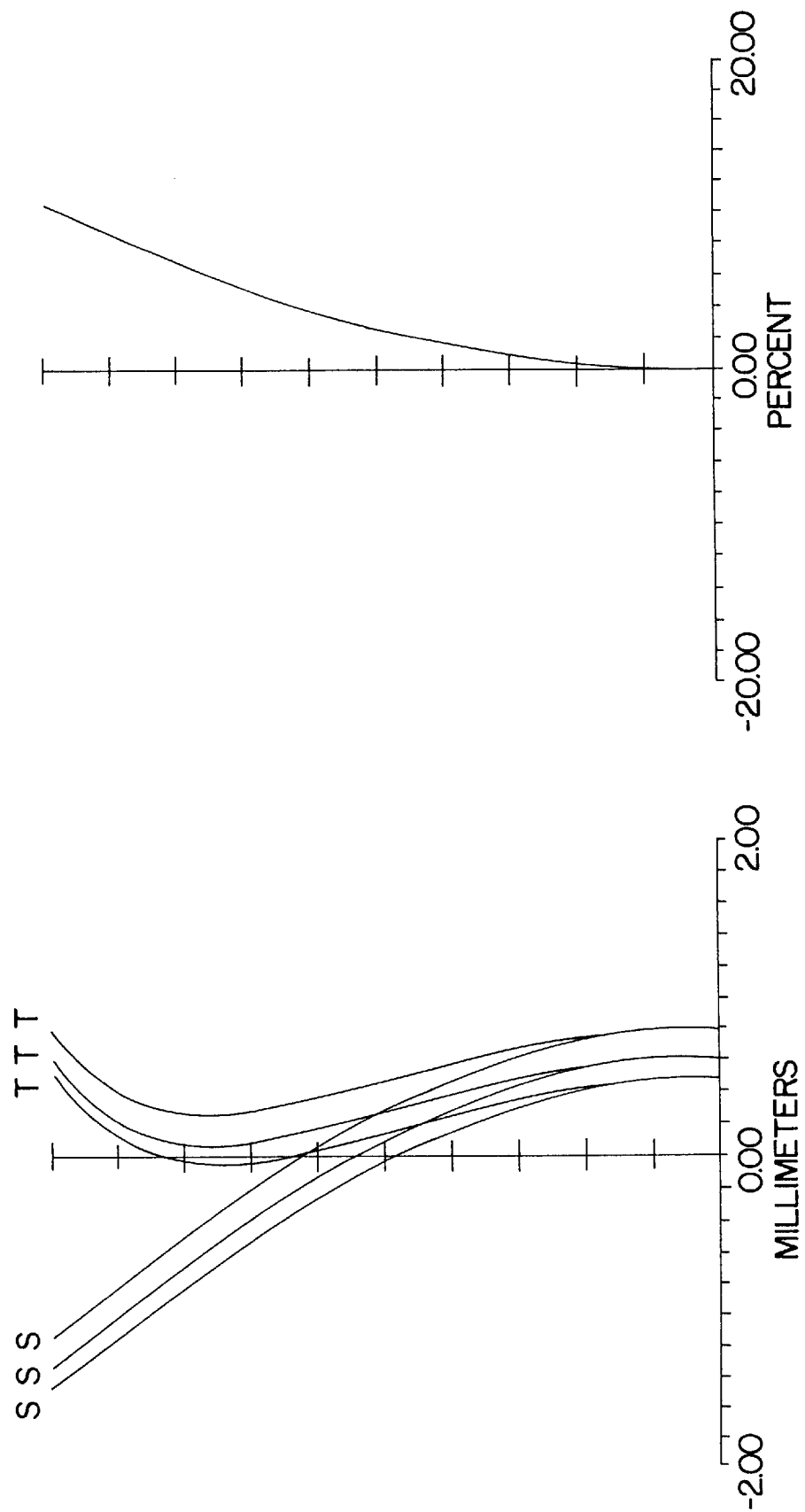
Figure 3C:
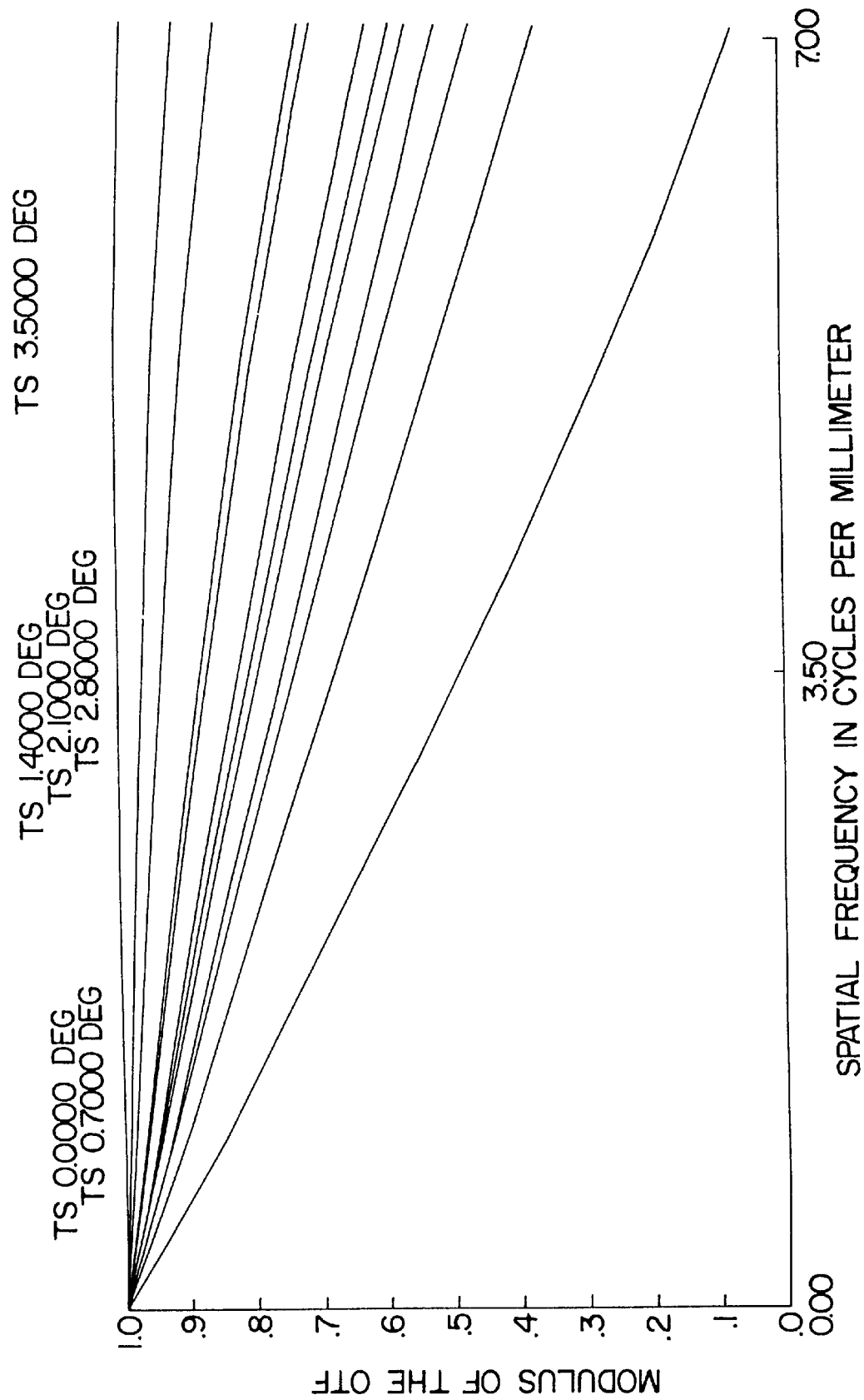

FIGS. 3a through 3c are charts illustrating the performance characteristics of the optical system of FIGS. 1 and 2. In particular, FIG. 3a is a chart of aberration curve diagrams for three representative wavelengths showing spherical and chromatic aberrations. In FIG. 3a, each of the x-axes is shown in normalized units and represents normalized entrance pupil coordinates. The y-axes are shown in microns and represent ray aberrations. FIG. 3b is a chart of aberration curve diagrams for three representative wavelengths showing field curvature and distortion. As shown therein, the x-axes are shown in millimeters and percentages and represent focus shift and ray distortion respectively, while the y-axes are shown in normalized units and represent normalized field coordinates. FIG. 3c is a chart showing the Merit Transfer Function (MTF) for the optical device of FIGS. 1 and 2. As used therein, the x-axis represents the spacial frequency in cycles per millimeter, and the y-axis represents the modulus of OTF in normalized units. These performance characteristics will be compared below with the performance characteristics of optical devices of the present invention.

A first embodiment of the present invention will now be described with joint reference to FIGS. 4 through 7c. An integral image erecting prism 30 in accordance with a first embodiment of the present invention is depicted in perspective view in FIG. 4. Prism 30 is intended for use in a prismatic optical device of the general nature discussed above such as a telescope. As shown in FIG. 4, light rays passing through prism 30 are initially incident upon generally circular refractive surface 32 along optical axis Lc, are totally internally reflected (four times by 90° each time) at inclined surfaces 34,35,36 and 37 and exit prism 30 at generally circular refractive surface 38 along parallel optical axis Lc'. Dimensions A, B, B' and C are preferably 10.10, 11.40, 11.40 and 22.80 millimeters respectively. These dimensions are ideally suited to intercept a ray cone of 5.7 mm in radius. However, those of ordinary skill will appreciate that these dimensions can be scaled as desired to accommodate other arrangements of objectives and oculars. As shown in the side elevation view of FIG. 5, refractive surfaces 32 and 38 of prism 30 in this embodiment have a radius of curvature of infinity. Restated, refractive surfaces 32 and 38 are planar. Also as shown, the perimeter of prism 30 has been molded to contour the edges such that refractive surfaces 32 and 38 present a minimum of non-ray path areas to the light rays incident thereto. Thus, refractive surfaces 32 and 38 are generally circular which enables prism 30 to fully function without unnecessarily enlarging the size of the device in which it is used.

Figure 5:
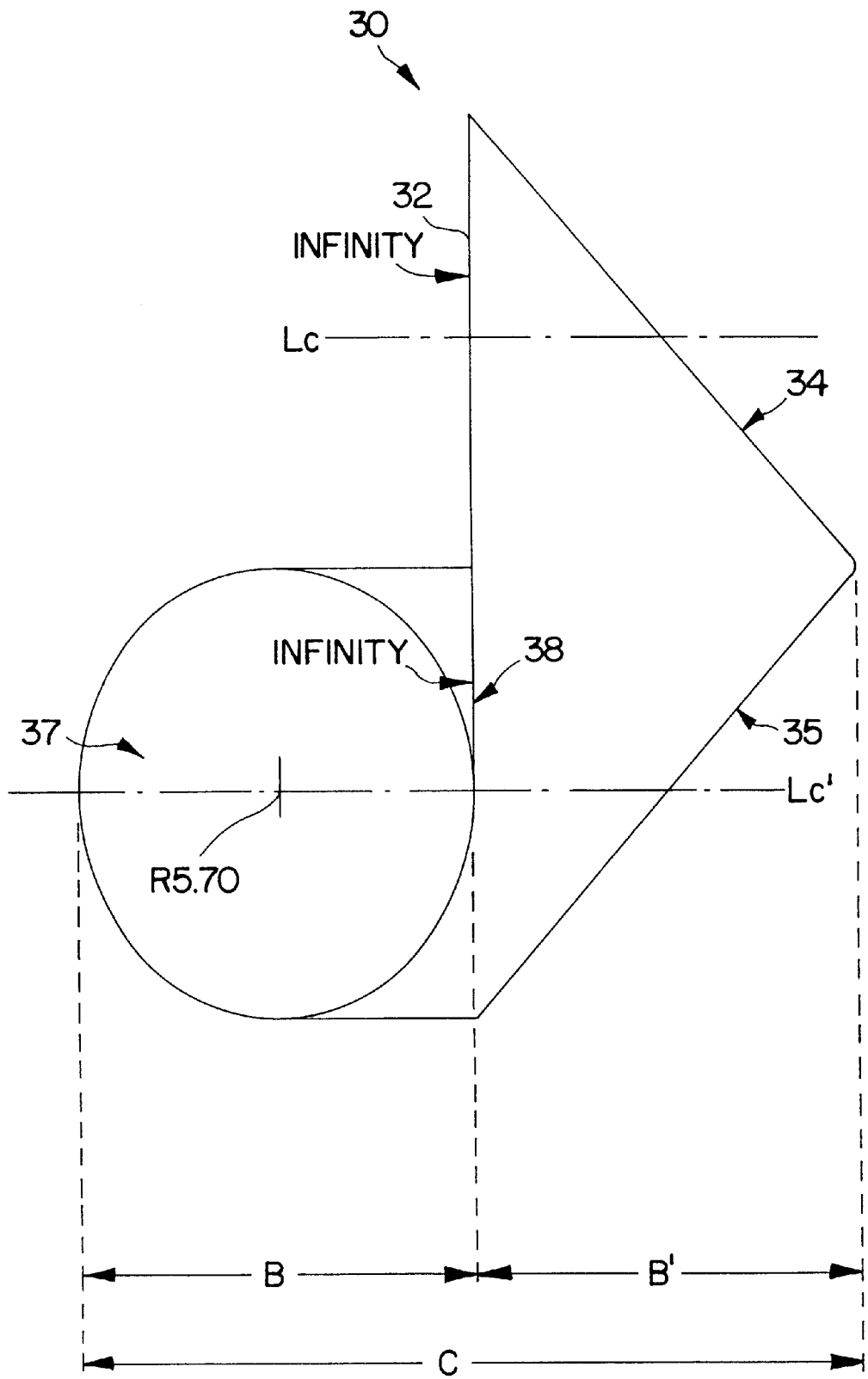
FIG. 5 is a side elevation view of the prism of FIG. 4.

Prism 30 of FIGS. 4 and 5 is preferably formed from a single piece of optical quality plastic. In order to achieve total internal reflection within prism 30, the plastic should have a refractive index of at least 1.42. However, higher refractive indices will tend to induce light rays passing through prism 30 to bend more toward the normal of the refractive surfaces thereby increasing the size of the ray cone exiting prism 30. Since this will unnecessarily increase the size of prism 30, the preferred index of refraction should be approximately, but not less than 1.42. Finally, prism 30 of FIGS. 4 and 5 is preferably formed from a material with an Abbe's number of at least 50 and most preferably with an Abbe's number of 57.40 in order to minimize chromatic dispersion.

Figure 6:
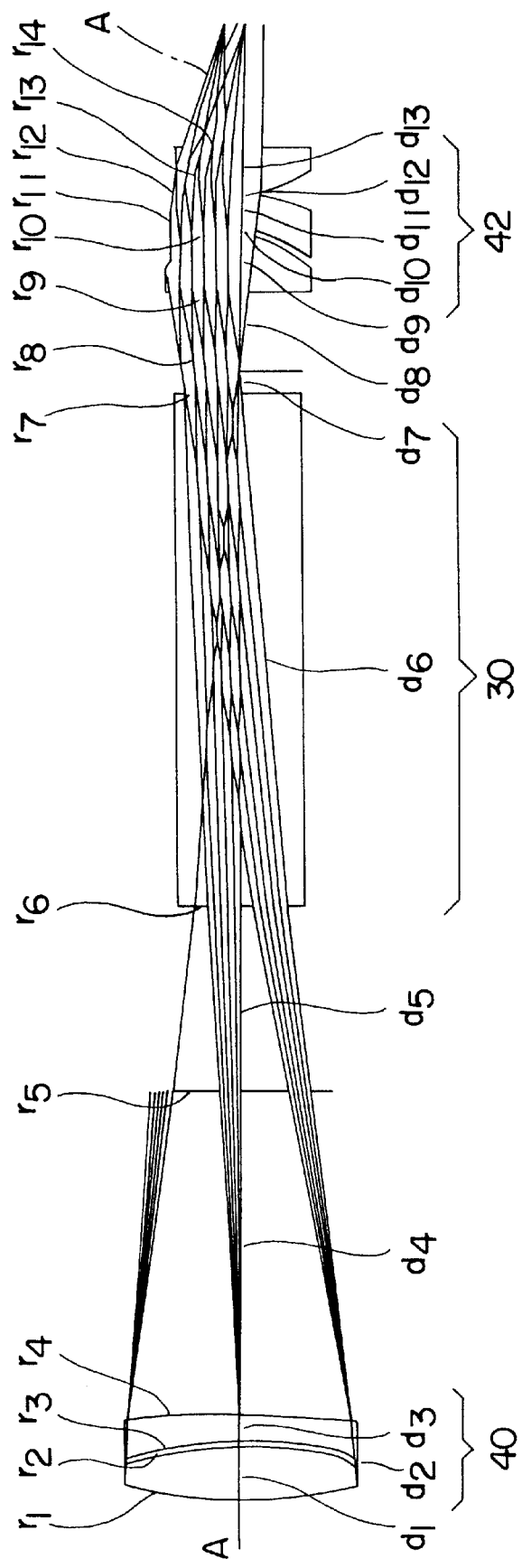
FIG. 6 is a light ray diagram of an inventive optical system employing the prism of FIGS. 4 and 5.

FIG. 6 is a light ray diagram of an optical device employing prism 30 of FIGS. 4 and 5. The optical device of FIG. 6 includes an objective 40, image erecting prism 30 and an ocular 42, all of which are preferably formed from plastic. Naturally, the device of FIG. 6 is disposed in an opaque body which encloses the device of FIG. 6 and holds objective 40, prism 30 and ocular 42 in fixed relation to one another.

Table II (below) is a chart containing preferred parameter values for the optical device shown in FIG. 6.

TABLE II

Focal length of objective, fob = 82.7 mm
Focal length of ocular, foc = 10.2 mm
Magnification power, B = 7.9 times
Objective diameter, $\phi$ = 21 mm
Apparent field of view, 2w = 7°
Ocular/Eye point distance, EP = 11.3 mm
Optical device overall length (object point = 00), $\Sigma d$ = 131.6163 mm

| fob = 82.0 mm | foc = 10.2 mm | B = 7.7X | $\phi$ = 21 mm |
|---|---|---|---|
| 2w = 7° | EP = 11.3 mm | $\Sigma d$ = 131.10991 mm | |
| (Objective 40) | | | |
| $r_1$ = 49.75 | $d_1$ = 5.0 | $n_1$ = 1.492 | $v_1$ = 57.40 |
| $r_2$ = −32.1303 | $d_2$ = 0.5 | | |
| $r_3$ = −31.2040 | $d_3$ = 2.5 | $n_3$ = 1.590 | $v_3$ = 30.90 |
| $r_4$ = 99.9123 | $d_4$ = 28.833 | | |
| $r_5$ = ∞ | $d_5$ = 16.0 | | |
| (Image erecting prism 30) | | | |
| $r_6$ = ∞ | $d_6$ = 45.6 | $n_6$ = 1.492 | $v_6$ = 57.40 |
| $r_7$ = ∞ | $d_7$ = 1.8476 | | |
| $r_6$ = ∞ | $d_8$ = 6.8956 | | |
| (Ocular 42) | | | |
| $r_9$ = 7.1533 | $d_9$ = 4.5001 | $n_9$ = 1.492 | $v_9$ = 57.40 |
| $r_{10}$ = −12.4266 | $d_{10}$ = 0.5 | | |
| $r_{11}$ = −10.3558 | $d_{11}$ = 3.0 | $n_{11}$ = 1.567 | $v_{11}$ = 34.80 |
| $r_{12}$ = −21.8442 | $d_{12}$ = 0.5 | | |
| $r_{13}$ = 7.6874 | $d_{13}$ = 4.1336 | $n_{13}$ = 1.492 | $v_{13}$ = 57.40 |
| $r_{14}$ = 8.7806 | | | |
| Aspheric Surfaces | | | |
| $r_4$ | k = 1.2623941 | | |
| $r_9$ | k = −1.5347441E + 10 | | |
| $r_{10}$ | k = 0 | A4 = −3.55633668E − 04 | |
| $r_{13}$ | k = −1.6862355 | | |
| $r_{14}$ | k = −2.0847610E + 16 | | |

Those of ordinary skill will appreciate that, as used in Table II, r represents the radius of curvature in millimeters, d represents the thickness as measured along axis A in millimeters, n represents the refractive index of the respective component shown therein, v represents the Abbe's number for the selected material, k represents the conic constant and A represents the coefficient of even aspheric surface. As indicated by the data in Table II, the optical device of FIG. 6 is designed for magnification of about eight times and preferably has an objective of no more than 21 millimeters.

Figure 7A:
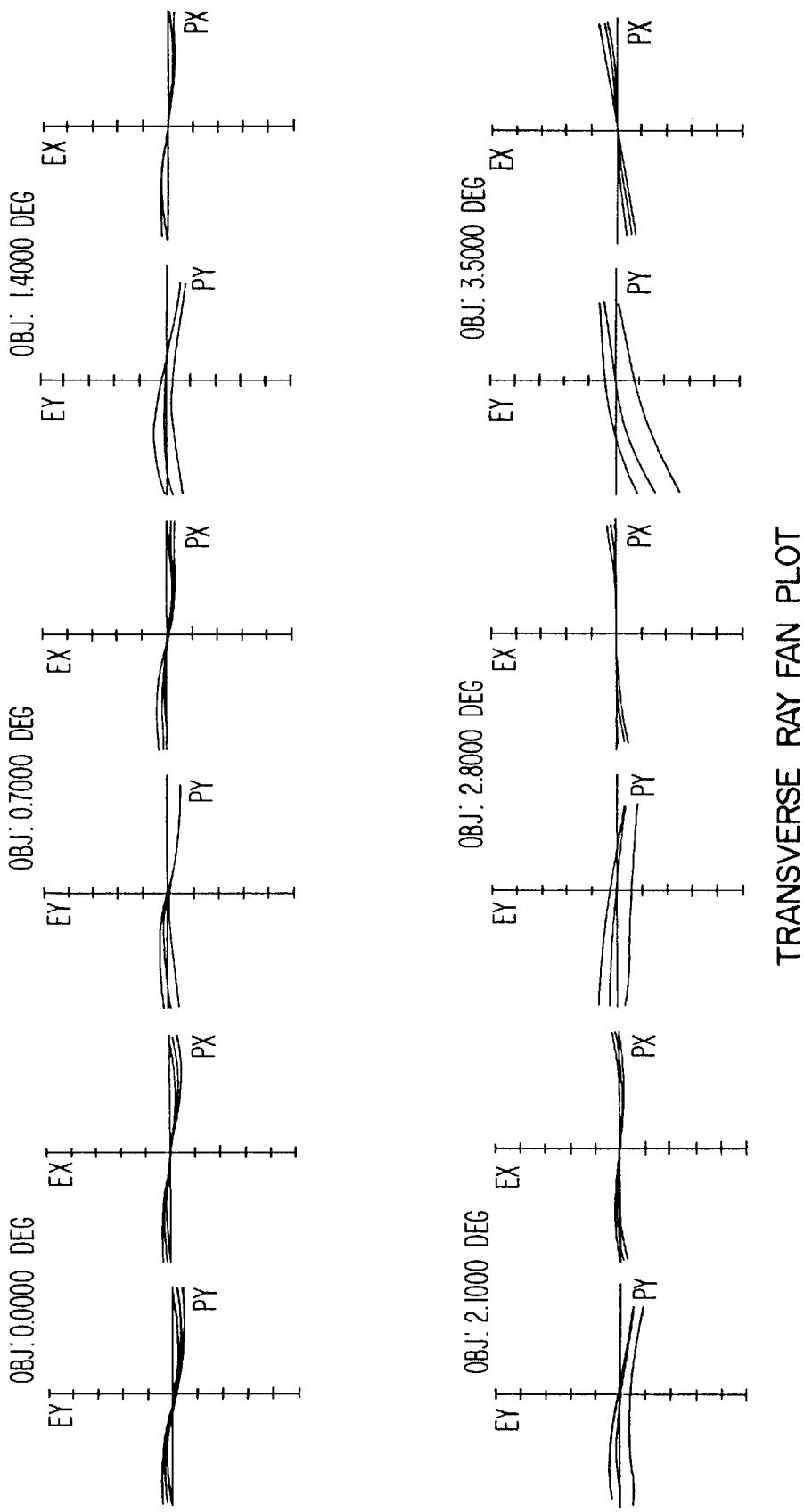
FIGS. 7a through 7c are charts illustrating the performance characteristics of the optical system of FIGS. 5 and 6.
Figure 7B:
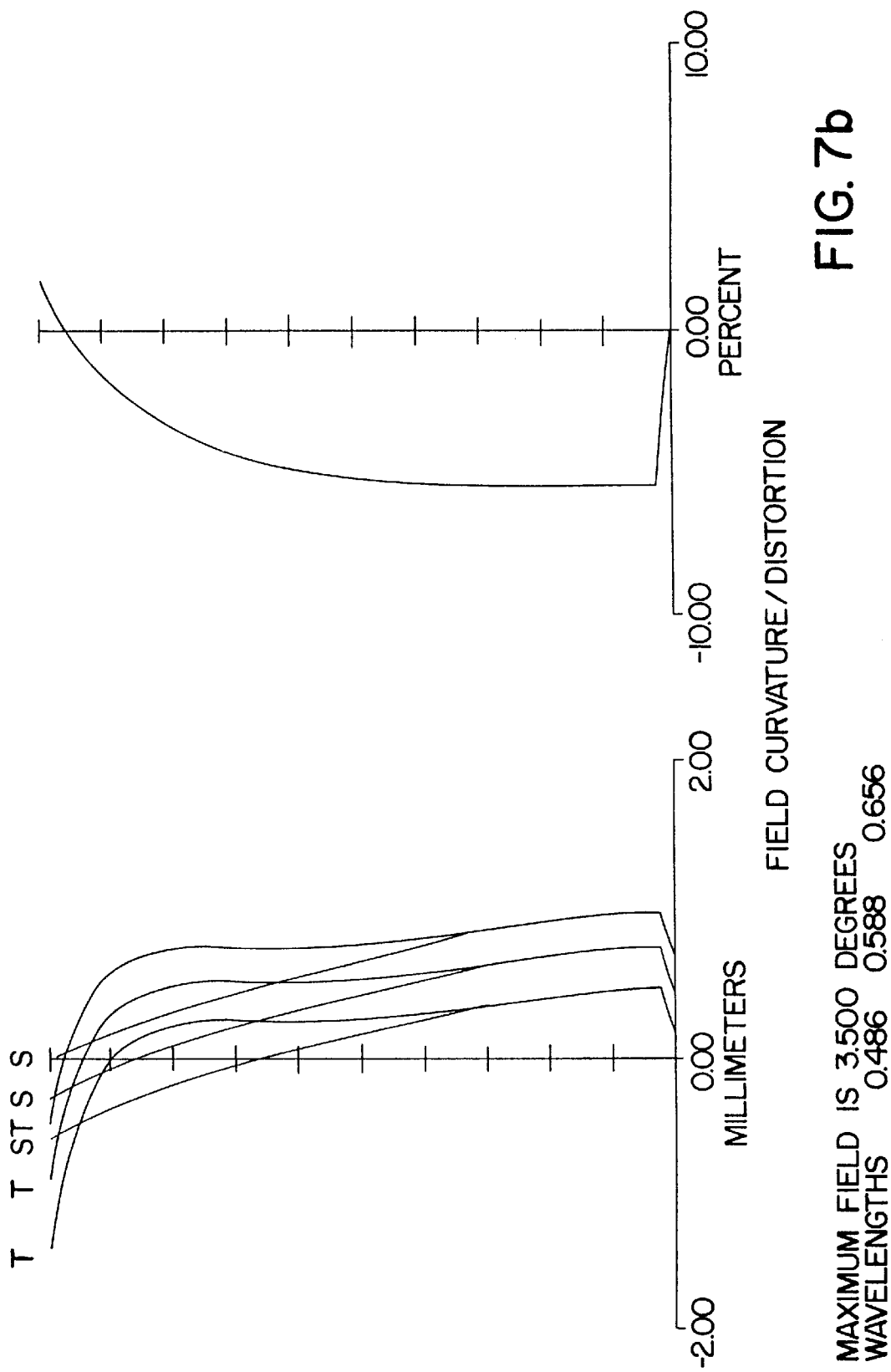
Figure 7C:
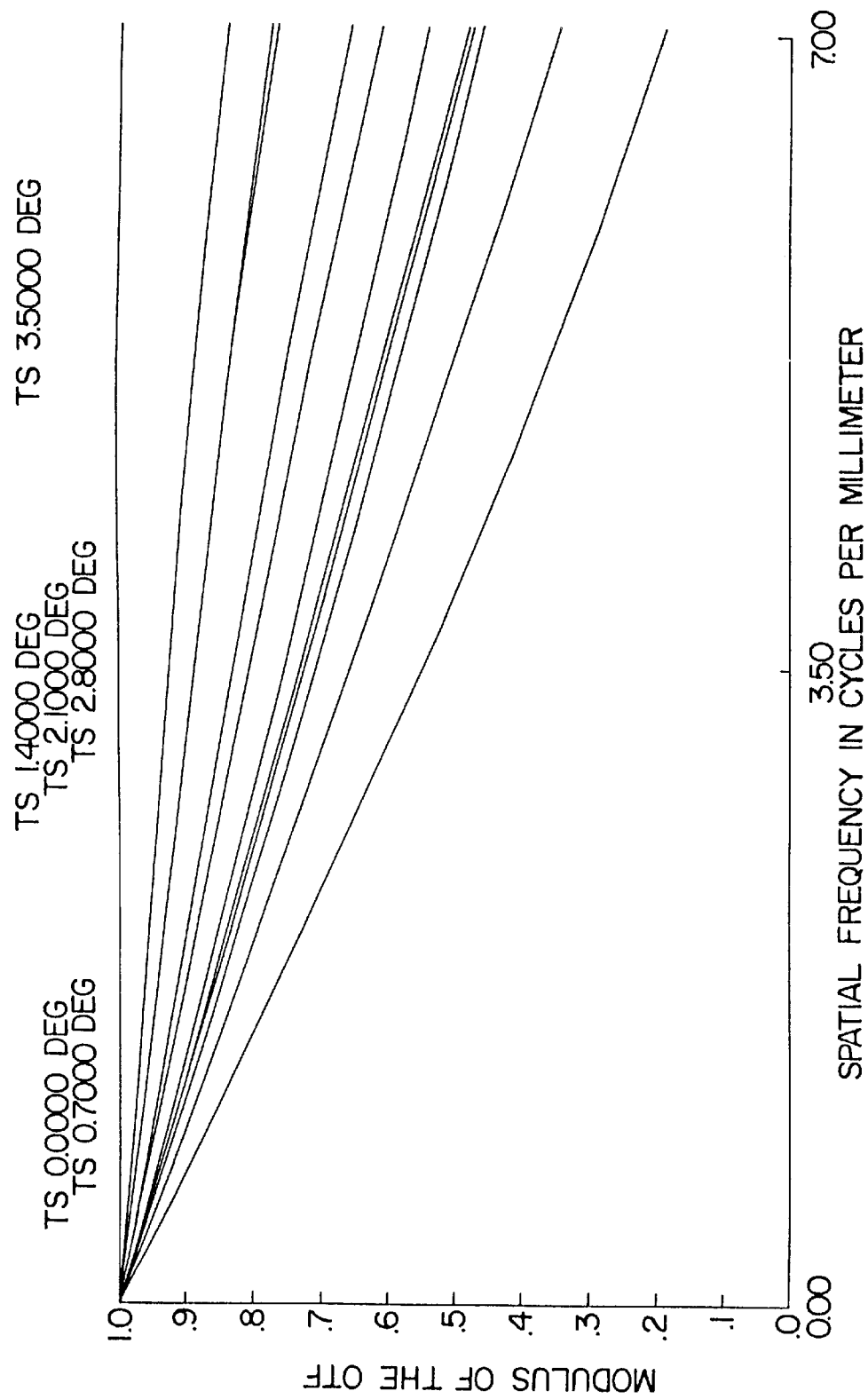

FIGS. 7a through 7c are charts illustrating the performance characteristics of the optical system of FIG. 6. In particular, FIG. 7a is a chart of aberration curve diagrams for three representative wavelengths showing spherical and chromatic aberrations. In FIG. 7a, each x-axis is shown in normalized units and represents normal entrance pupil coordinates. Also, the y-axes are shown in microns and represent ray aberrations. FIG. 7b is a chart of aberration curve diagrams for three representative wavelengths showing field curvature and distortion. As shown therein, the x-axes are shown in millimeters and percentages and represent normalized field coordinates, while the y-axes are shown in normalized units and represent normalized field coordinates. FIG. 7c is a chart of various wavelengths at various angles of field showing the Merit Transfer Function (MTF) for the optical device of FIG. 6. As used therein, the x-axis represents the spacial frequency in cycles per millimeter, and the y-axis represents the modulus of OTF in normalized units. A comparison of these performance characteristics with the performance characteristics (shown in FIGS. 3a through 3c) of the related art optical device of FIGS. 1 and 2 readily reveals that, while the integral prism 30 of the present invention offers superior light transmission performance, i.e., lower losses, relative to the optical device of the related art, the use of integral plastic prism 30 introduces spherical aberrations and chromatic aberrations which are greater than those of the glass prisms of the related art.

The preferred embodiment of the present invention will now be described with joint reference to FIGS. 8 through 10c. An integral image erecting prism 30' in accordance with the preferred embodiment of the present invention is depicted in side elevation view in FIG. 8. As indicated by the use of reference numerals related to those used in FIGS. 4 and 5, prism 30' is of the same general configuration and operates in a manner similar to prism 30 of the first embodiment of the present invention described above. For example, prism 30' is preferably formed from the same materials as described above with respect to the first embodiment. Additionally, prism 30' preferably has the same dimensions as prism 30.

However, unlike surfaces 32 and 38 of the previous embodiment, refractive surfaces 32' and 38' of prism 30' have finite radii of curvature. In particular, refractive surface 32' preferably has a generally circular concave region with a radius of 4288.4306 millimeters, and refractive surface 38' preferably has a generally circular convex region with a radius of 94.0455 millimeters. Advantageously contouring refractive surfaces 32' and 38' in this manner enables prism 30' to compensate for at least some of the aberrations introduced by an objective when prism 30' is used in an optical device of the general nature discussed above.

While such refractive surface contouring is possible with the glass prisms of the related art, it is, at least in part, made economically feasible by forming prism 30' from plastic suitable for optical applications. However, forming prism 30' from a single plastic element has the potential to introduce intolerably high spherical and chromatic aberrations. This was illustrated above when comparing the first embodiment of the present invention to the related art. Accordingly, contouring refractive surfaces 32' and 38' as described above yields the additional benefit of avoiding aberrations which would otherwise occur due to the use of plastics to form integral prism 30'. As a result, and as shown in greater detail below, prism 30' of the present invention offers improved light transmission performance with no significant increase in spherical and chromatic aberrations relative to the glass prisms of the related art. Further, prism 30' does so in a much less expensive way.

Figure 8:
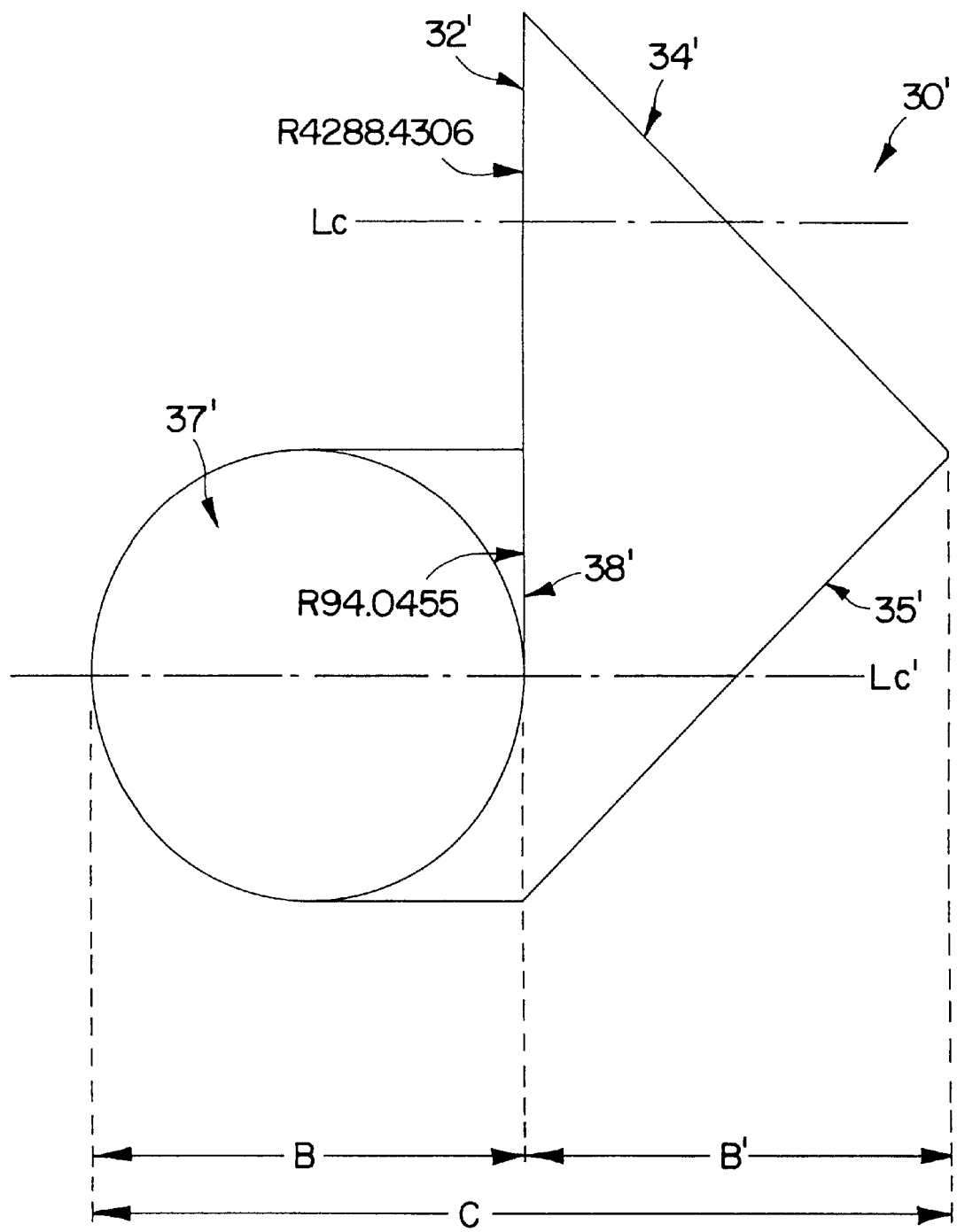
FIG. 8 is a side elevation view similar to FIG. 5 depicting an integral image erecting prism in accordance with a preferred embodiment of the present invention.
Figure 9:
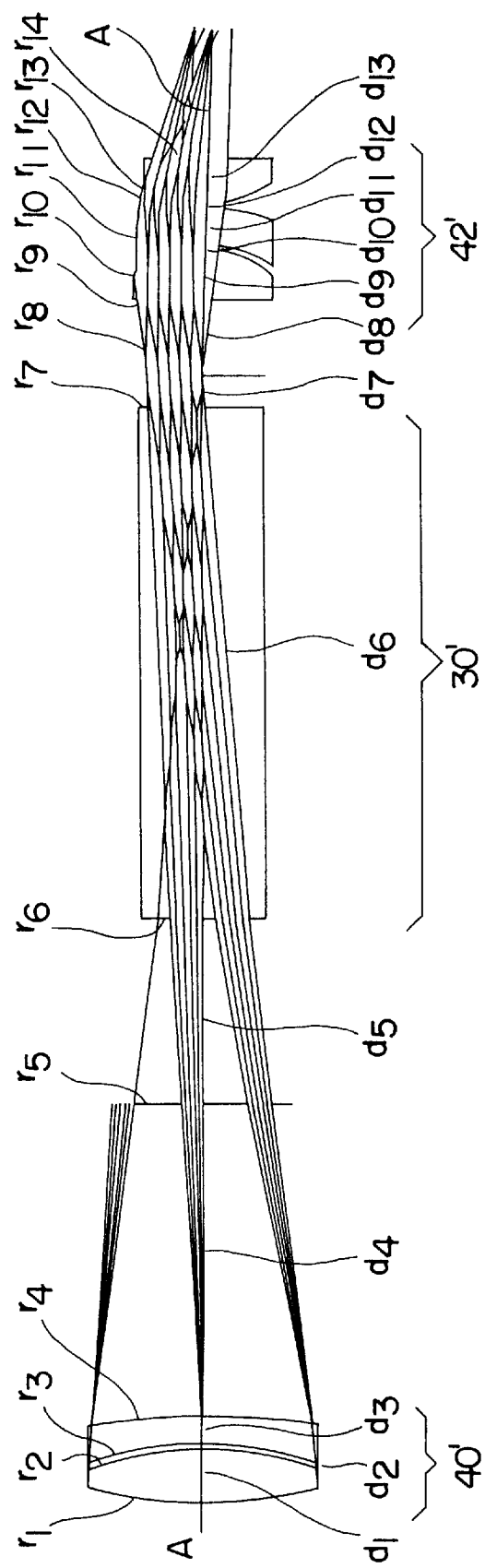
FIG. 9 is a light ray diagram of an inventive prismatic optical system employing the prism of FIG. 8.

FIG. 9 is a light ray diagram of an optical device of the same general nature described above with respect to FIG. 6 utilizing the prism 30' of FIG. 8. The optical device of FIG. 9 includes an objective 40', image erecting prism 30' and an ocular 42'.

Table III is a chart containing preferred parameter values for the optical system of FIG. 9.

TABLE III

Focal length of objective, fob = 82.7 mm
Focal length of ocular, foc = 10.2 mm
Magnification power, B = 7.9 times
Objective diameter, φ = 21 mm
Apparent field of view, 2w = 7°
Ocular/Eye point distance, EP = 11.3 mm
Optical device overall length (object point = 00), Σd = 131.6163 mm

| (Objective 40') | | | |
|---|---|---|---|
| $r_1$ = 45.8471 | $d_1$ = 5.0 | $n_1$ = 1.492 | $v_1$ = 57.40 |
| $r_2$ = −30.7459 | $d_2$ = 0.5 | | |
| $r_3$ = −29.6481 | $d_3$ = 2.5 | $n_3$ = 1.590 | $v_3$ = 30.90 |
| $r_4$ = −113.5992 | $d_4$ = 28.833 | | |
| $r_5$ = ∞ | $d_5$ = 16.0 | | |
| (Image erecting prism 30') | | | |
| $r_6$ = −4288.4306 | $d_6$ = 45.6 | $n_6$ = 1.492 | $v_6$ = 57.40 |
| $r_7$ = −94.0455 | $d_7$ = 2.5996 | | |
| $r_8$ = ∞ | $d_8$ = 6.65 | | |
| (Ocular 42') | | | |
| $r_9$ = 7.1533 | $d_9$ = 4.5001 | $n_9$ = 1.492 | $v_9$ = 57.40 |
| $r_{10}$ = −12.4266 | $d_{10}$ = 0.5 | | |
| $r_{11}$ = −10.3558 | $d_{11}$ = 3.0 | $n_{11}$ = 1.567 | $v_{11}$ = 34.80 |

TABLE III-continued

| | | | |
|---|---|---|---|
| $r_{12} = -21.8442$ | $d_{12} = 0.5$ | | |
| $r_{13} = 7.6874$ | $d_{13} = 4.1336$ | $n_{13} = 1.492$ | $v_{13} = 57.40$ |
| $r_{14} = 8.7806$ | | | |
| Aspheric Surfaces | | | |
| $r_4$ | $k = 7.0894579$ | | |
| $r_9$ | $k = -1.5347441E + 10$ | | |
| $r_{10}$ | $k = 0$ | $A4 = -3.55633668E - 04$ | |
| $r_{13}$ | $k = -1.6862355$ | | |
| $r_{14}$ | $k = -2.0847610E + 16$ | | |

Those of ordinary skill will appreciate that, as used in Table III, r represents the radius of curvature in millimeters, d represents the thickness as measured along axis A in millimeters, n represents the refractive index of respective components shown therein, v represents the Abbe's number of the selected material, k represents the conic constant and A represents the coefficient of aspheric surface.

Figure 10A:
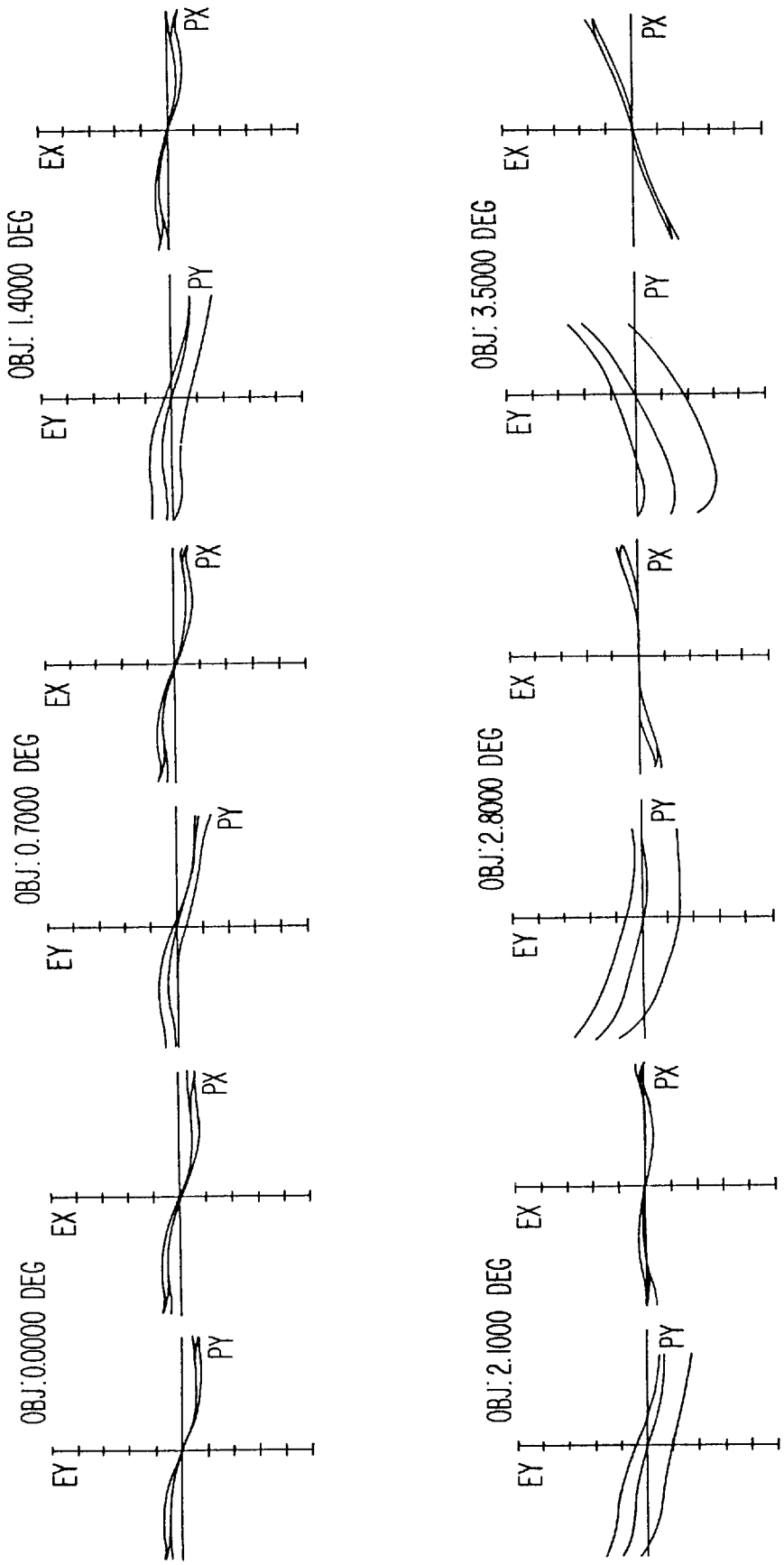
Figure 10B:
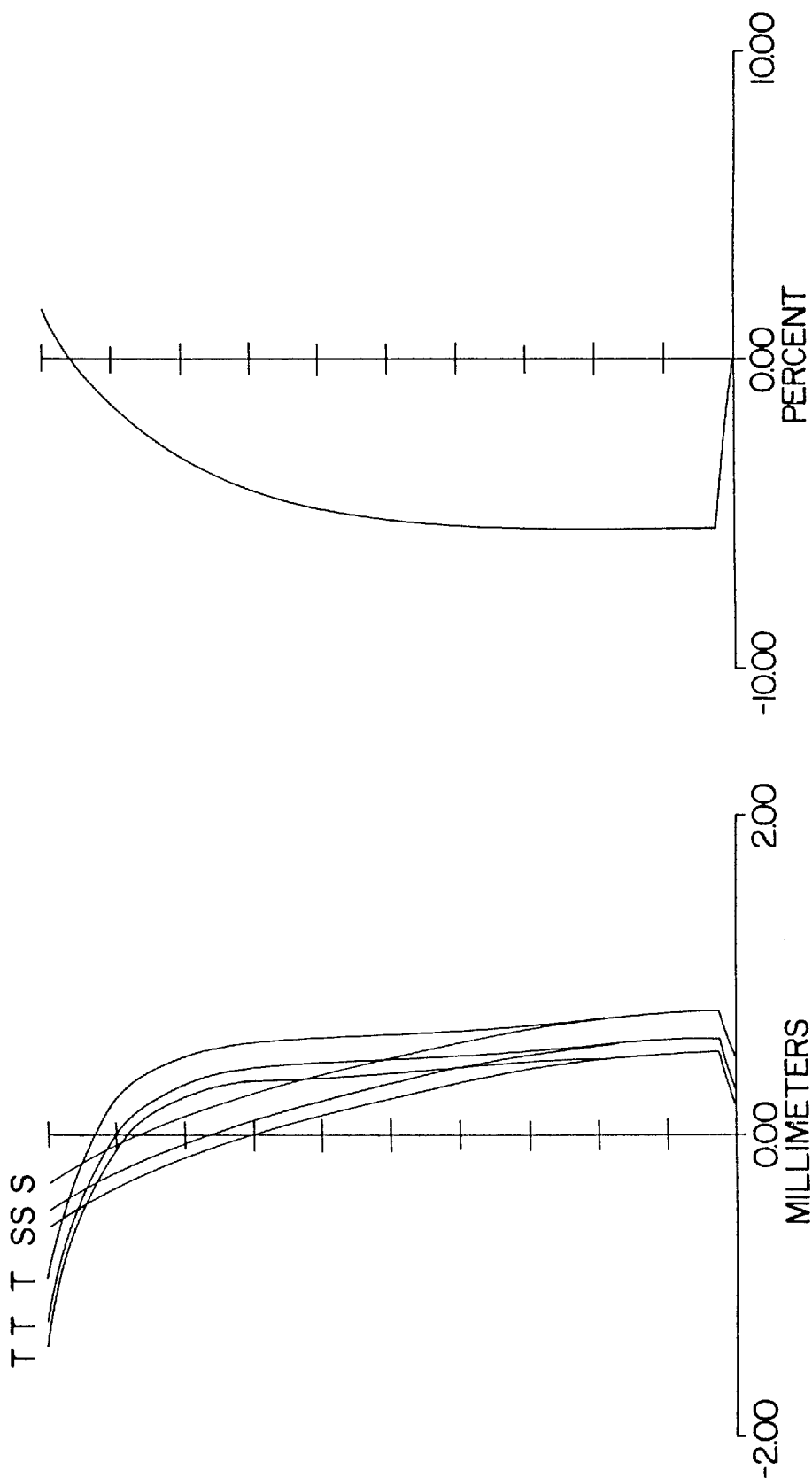

FIGS. 10a through 10c are charts illustrating the performance characteristics of the optical system of FIG. 9. In particular, FIG. 10a is a chart of aberration curve diagrams for three representative wavelengths showing spherical and chromatic aberrations. As shown therein, each x-axis is in normalized units and represents normal entrance pupil coordinates, and each y-axis is in microns and represents ray aberrations. FIG. 10b is a chart of aberration curve diagrams for three representative wavelengths showing field curvature and distortion. The x-axes are shown therein in millimeters and percentages and represent normalized field coordinates, while the y-axes are shown in normalized units and represent normalized field coordinates. FIG. 10c is a chart of various wavelengths at various angles of field showing the Merit Transfer Function (MTF) for the optical device of FIG. 9. As used therein, the x-axis represents the spacial frequency in cycles per millimeter, and the y-axis represents the modulus of OTF in normalized units. A comparison of these performance characteristics with the performance characteristics (shown in FIGS. 3a through 3c) of the related art optical devices of FIGS. 1 and 2 and the performance characteristics (shown in FIGS. 7a through 7c) of the first embodiment of FIG. 7 readily reveals that integral prism 30' of the present invention offers superior performance relative to both of the previously described devices. In particular, integral plastic prism 30' exhibits the low light transmission loss properties of integral prism 30 while exhibiting low aberration properties of the non-integral glass Porro prism erecting system 22.

Figures 11A, 11B:
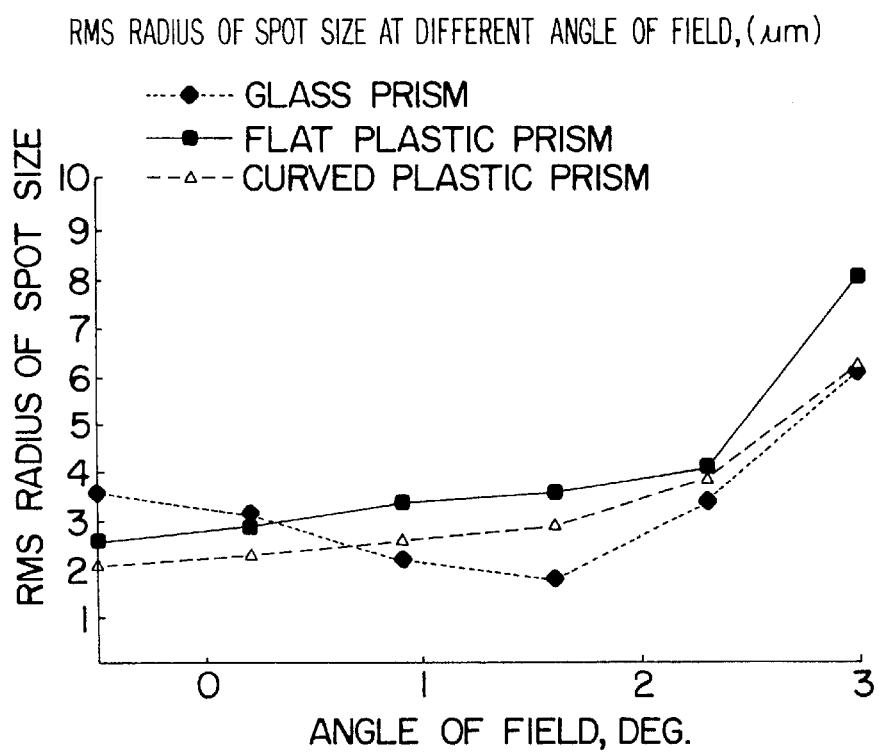
Figures 12A, 12B:
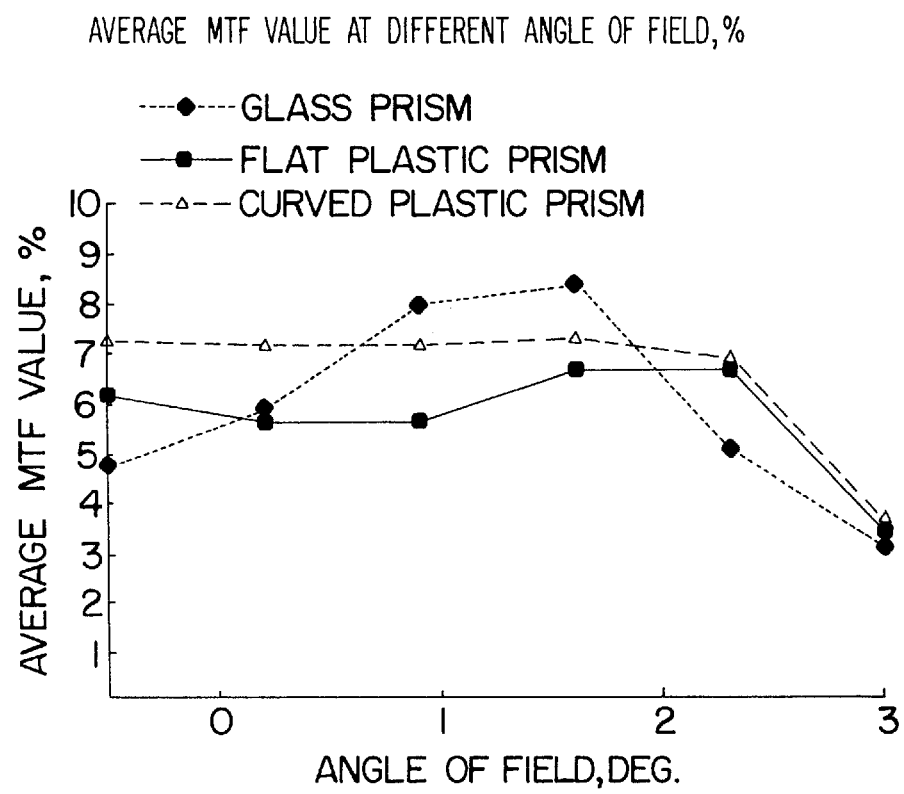
Figures 13A, 13B:
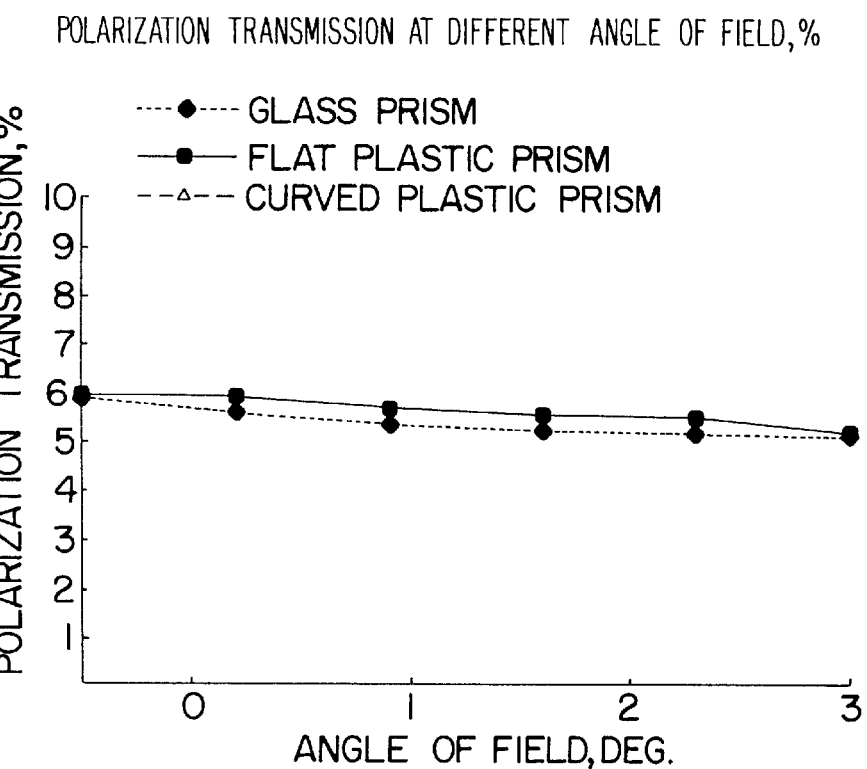

FIGS. 11a through 13b are additional charts summarizing the performance characteristics of the optical devices of FIGS. 1–2 (utilizing glass prisms), FIG. 7 (utilizing an integral plastic prism) and FIG. 9 (utilizing an integral curved plastic prism). In particular, FIGS. 11a and 11b are comparison charts of the spot size radius (RMS) for various angles of field. FIGS. 12a and 12b are comparison charts of the average MTF for various angles of field. FIGS. 13a and 13b are comparison charts of light transmission values for various angles of field. These comparison charts further illustrate the superiority of the integral prism 30' relative to both of the previously described optical devices.

A number of alternatives to the embodiments described above are also possible. For example, integral prisms 30 or 30' could be in the form of a pair of pentangular roof prisms arranged at right angles to one another instead of a pair of Porro prisms. Additionally, the preferred optical devices of the present invention utilize plastic objectives and oculars. However, glass could also be used to form these components. Some of the advantages of the present invention could also be achieved by employing a non-integral image erecting prism system provided contoured refracting surfaces such as those of prism 30' are employed. Finally, those of ordinary skill will readily appreciate that the various dimensions of the various devices discussed herein could be scaled as desired with no appreciable change in performance.

While the present invention has been described in connection with what is presently considered to be the most practical and preferred embodiments, it is to be understood that the invention is not limited to the disclosed embodiments, but is intended to cover various modifications and equivalent arrangements included with the spirit and scope of the appended claims.

What is claimed is:

1. A prismatic optical device for viewing a magnified image of an object comprising:
    a light transmissive objective for permitting light rays comprising an image to enter said optical device and pass therethrough along a first optical axis whereby the light rays converge on a focal point on said first optical axis, said objective causing inversion of the image as the light rays pass therethrough, said objective having a diameter which is not larger than 21 mm;
    a light transmissive image erecting prism system in optical communication with said objective for inversion of the image therein, said erecting system comprising at least one prism having a first curved refracting surface axially aligned with said first optical axis through which the light rays enter said prism and a second curved refracting surface through which the light rays exit said prism along a second optical axis which is parallel to said first optical axis, the light rays exiting said second refracting surface of said prism in the form of a ray cone less than 5.7 mm in radius, said at least one prism totally internally reflecting the light rays by about 90° four times between said reception of the light rays and said exit of the light rays, said first and second curved surfaces reducing spherical and chromatic aberrations induced into the image by said objective as the light rays pass therethrough; and
    a light transmissive ocular in optical communication with said erecting system along said second optical axis and permitting the light rays to pass therethrough whereby the light rays converge at a predetermined focal point on said second optical axis;
    wherein said optical device has a magnification factor of at least about 8, said optical device is about 131 mm in length and has a full angle of view which is less than 7 degrees.

2. The optical device of claim 1, wherein said prism is an integrally formed Porro prism erecting system.

3. The optical device of claim 1, wherein said prism is formed from a plastic having a refractive index of about 1.42.

4. The optical device of claim 1, wherein said first refractive surface comprises a concave surface.

5. The optical device of claim 4, wherein said second refractive surface comprises a convex surface.

6. The optical device of claim 1, wherein said second refractive surface comprises a convex surface.

7. The optical device of claim 1, wherein said prism is formed from a material having an Abbe's number of at least 50.

8. The optical device of claim 1, wherein said erecting system includes an integrally formed prism comprising a pair of roof prisms arranged at right angles to one another.

9. The optical device of claim 1, wherein said optical device is a telescope.

10. The optical device of claim 5, wherein each of said refractives comprises a generally circular region.

11. An image erecting prism system for use in a prismatic optical system of the type which receives light rays through an objective along a first optical axis and passes the light rays outwardly therefrom through an ocular along a second optical axis which is generally parallel to the first optical axis, the objective having a diameter which is not larger than 21 mm, said prism system comprising:

at least one prism having a first curved refracting surface through which the light rays from the objective enter said prism along the first optical axis and a second curved refracting surface through which the light rays exit said prism in the form of a ray cone less than 5.7 mm in radius along the second optical axis and pass to the ocular, said first and second curved surfaces compensating for spherical and chromatic aberrations induced into the light rays by the objective as the light rays pass therethrough, said at least one prism totally internally reflecting the light rays by about 90° four times within said prism as the light rays pass therethrough;

wherein said optical system has a magnification factor of at least about 8, said optical system is about 131 mm in length and has a full angle of view which is less than 7 degrees.

12. The image erecting prism system of claim 11, wherein said prism comprises an integrally formed Porro prism system;

is formed from a plastic having a refractive index of no less than about 1.42; and is formed from a plastic having an Abbe's number of at least 50.

13. The image erecting prism system of claim 11, wherein said first refractive surface is a concave surface with a radius of curvature of about 4290 millimeters and wherein said second refractive surface is a convex surface with a radius of curvature of about 94 millimeters.

14. The image erecting prism system of claim 11, wherein said erecting system includes an integral pair of roof prisms.

15. The image erecting prism system of claim 11, wherein said first refractive surface is a generally circular concave region with a radius of curvature of about 4290 millimeters and wherein said second refractive surface is a generally circular convex region with a radius of curvature of about 94 millimeters.

* * * * *